US012338095B2

(12) United States Patent
Bosoku et al.

(10) Patent No.: US 12,338,095 B2
(45) Date of Patent: Jun. 24, 2025

(54) PROCESSING DEVICE AND RECORDING DEVICE

(71) Applicant: SEIKO EPSON CORPORATION, Tokyo (JP)

(72) Inventors: Makoto Bosoku, Matsumoto (JP); Shun Ito, Matsumoto (JP); Atsuhiko Takeuchi, Matsumoto (JP); Yosuke Nakano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 119 days.

(21) Appl. No.: 18/505,475

(22) Filed: Nov. 9, 2023

(65) Prior Publication Data

US 2024/0149594 A1 May 9, 2024

(30) Foreign Application Priority Data

Nov. 9, 2022 (JP) ................................ 2022-179339

(51) Int. Cl.
*B65H 31/20* (2006.01)
*B41J 13/10* (2006.01)
*B65H 31/02* (2006.01)

(52) U.S. Cl.
CPC ............ *B65H 31/20* (2013.01); *B41J 13/106* (2013.01); *B65H 31/02* (2013.01); *B65H 2402/32* (2013.01); *B65H 2402/33* (2013.01); *B65H 2403/41* (2013.01); *B65H 2403/945* (2013.01); *B65H 2404/6911* (2013.01); *B65H 2405/324* (2013.01); *B65H 2701/11312* (2013.01); *B65H 2801/36* (2013.01)

(58) Field of Classification Search
CPC ........ B65H 31/20; B65H 31/02; B65H 31/22; B65H 2701/11312; B65H 2801/36; B65H 2401/14
See application file for complete search history.

(56) References Cited

U.S. PATENT DOCUMENTS 11,565,540 B2 * 1/2023 Yato .................... B41J 13/0009
11,591,176 B2 * 2/2023 de la Hoz Matveeva .................. B65H 31/20
12,269,261 B2 * 4/2025 Bosoku ................. B41J 15/046
(Continued)

FOREIGN PATENT DOCUMENTS

JP 2015-189559 A 11/2015
JP 2022-064292 A 4/2022

*Primary Examiner* — Jeremy R Severson
(74) *Attorney, Agent, or Firm* — Dority & Manning, P.A.

(57) ABSTRACT

A processing device includes a processing unit and a medium accommodation portion, and the medium accommodation portion includes a flexible sheet-like accommodation member, a pivot shaft to which one end of the accommodation member is coupled, an operation portion to which the other end of the accommodation member is coupled and that is provided separably from the pivot shaft, and a pair of support portions that supports both ends of the operation portion, and the accommodation member is wound around the pivot shaft and stored inside the housing when the operation portion approaches the pivot shaft, and is unwound from the pivot shaft and hung down to accommodate the medium when the operation portion is separated from the pivot shaft, and holds a weight closer to the other end than to an intermediate position between the one end and the other end in the advance and retreat direction.

14 Claims, 13 Drawing Sheets

(56) References Cited

U.S. PATENT DOCUMENTS

| | | | | |
|---|---|---|---|---|
| 2015/0273897 | A1 | 10/2015 | Kato et al. | |
| 2022/0111668 | A1 | 4/2022 | Yato et al. | |
| 2024/0166458 | A1 * | 5/2024 | Bosoku .................... | B65H 9/10 |

* cited by examiner

PROCESSING DEVICE AND RECORDING DEVICE

The present application is based on, and claims priority from JP Application Serial Number 2022-179339, filed Nov. 9, 2022, the disclosure of which is hereby incorporated by reference herein in its entirety.

BACKGROUND

1. Technical Field

The present disclosure relates to a processing device and a recording device.

2. Related Art

In the related art, various processing devices such as recording devices have been used as processing devices that perform processing on a medium. Among these, there is a processing device that includes a medium accommodation portion that receives a processed medium. For example, JP-A-2022-64292 discloses a processing device including a sheet-like accommodation member that is stored inside a housing when not accommodating a medium and can unwind to a position at which the medium can be accommodated when accommodating the medium.

The medium accommodation portion of the processing device disclosed in JP-A-2022-64292 includes a sheet-like accommodation member that can be stored inside the housing and a pivot shaft, and is configured to accommodate the medium discharged from the housing when the accommodation member is unwound from the pivot shaft. In the medium accommodation portion having such a configuration, there is concern that the accommodation member may not be unwound normally depending on a material or flexibility of the accommodation member. This is because, as an example, the accommodation member jumps up vigorously and is caught by an operation portion or the like at an initial stage in which the accommodation member is unwound, and then, when the accommodation member wound around the pivot shaft is unwound according to a movement of the operation portion, the accommodation member on the outer side wound around the pivot shaft does not follow the rotation of the pivot shaft or the rotation of the accommodation member on the inner side. Further, as another example, frictional resistance when the accommodation member comes into contact with a constituent member of the processing device is too high compared to a mass of the accommodation member, making it difficult for the accommodation member to drop, and an amount of unwinding of the accommodation member is insufficient.

SUMMARY

A processing device of the present disclosure for solving the above problems includes a processing unit accommodated in a housing and configured to process a medium; and a medium accommodation portion configured to accommodate the medium discharged from the housing, wherein the medium accommodation portion includes a flexible sheet-like accommodation member; a pivot shaft provided inside the housing, one end of the accommodation member being coupled to the pivot shaft; an operation portion to which the other end of the accommodation member is coupled and provided separably from the pivot shaft; and a pair of support portions advanceably and retreatably protruding from the housing in an advance and retreat direction in a separation direction from the pivot shaft of the operation portion, and configured to support both ends of the operation portion, and the accommodation member is wound around the pivot shaft and stored inside the housing when the operation portion approaches the pivot shaft, and is unwound from the pivot shaft and hung down to accommodate the medium when the operation portion is separated from the pivot shaft, and holds a weight on the other end side of an intermediate position between the one end and the other end in the advance and retreat direction.

A recording device according to the present disclosure for solving the above problem includes a recording unit accommodated in a housing and configured to perform recording on a medium; and a medium accommodation portion configured to accommodate the medium discharged from the housing, wherein the medium accommodation portion includes a flexible sheet-like accommodation member; a pivot shaft provided inside the housing, one end of the accommodation member being coupled to the pivot shaft; an operation portion to which the other end of the accommodation member is coupled and provided separably from the pivot shaft; and a pair of support portions advanceably and retreatably protruding from the housing in an advance and retreat direction in a separation direction from the pivot shaft of the operation portion, and configured to support both ends of the operation portion, and the accommodation member is wound around the pivot shaft and stored inside the housing when the operation portion approaches the pivot shaft, and is unwound from the pivot shaft and hung down to accommodate the medium when the operation portion is separated from the pivot shaft, and holds a weight on the other end side of an intermediate position between the one end and the other end in the advance and retreat direction.

DESCRIPTION OF EMBODIMENTS

Figure 1:
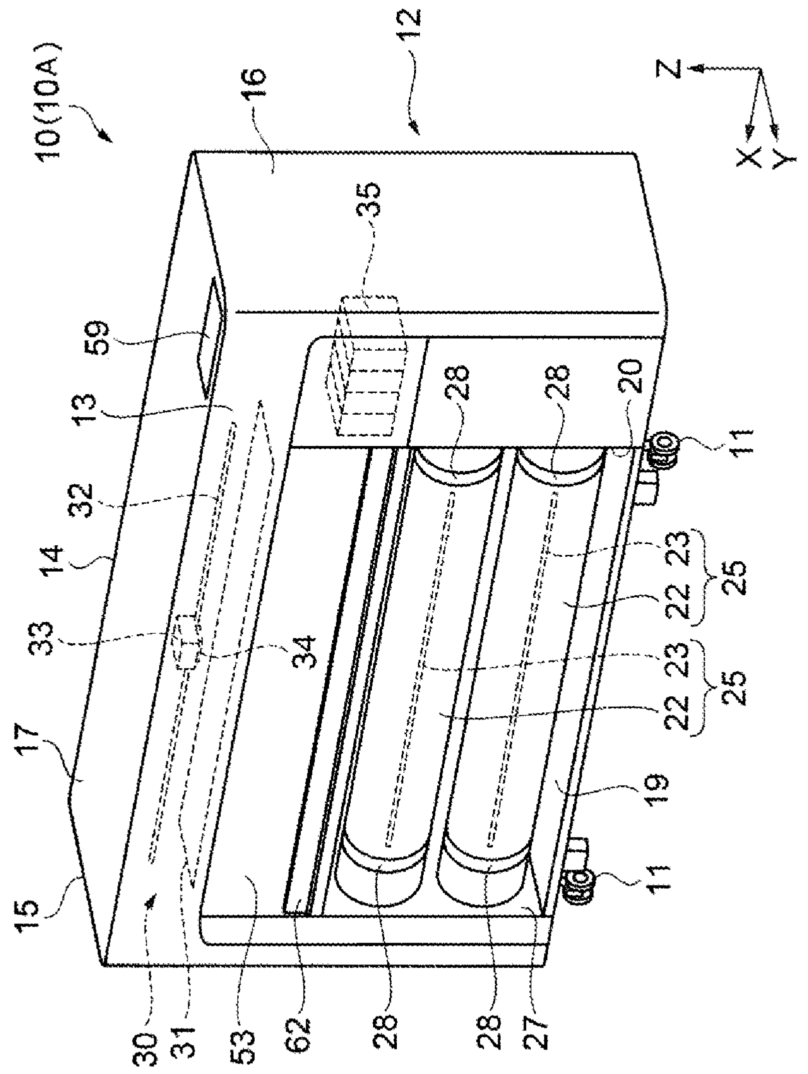
FIG. 1 is a perspective view illustrating a configuration of a recording device of Example 1 as a processing device according to an embodiment, and is a view illustrating a state (attached state) when an operation portion has fully entered a front wall of a housing.

First, the present disclosure will be schematically described.

A processing device according to a first aspect of the present disclosure for solving the above problem includes: a processing unit accommodated in a housing and configured to process a medium; and a medium accommodation portion configured to accommodate the medium discharged from the housing, wherein the medium accommodation portion includes a flexible sheet-like accommodation member; a pivot shaft provided inside the housing, one end of the accommodation member being coupled to the pivot shaft; an operation portion to which the other end of the accommodation member is coupled and provided separably from the pivot shaft; and a pair of support portions advanceably and retreatably protruding from the housing in an advance and retreat direction in a separation direction from the pivot shaft of the operation portion, and configured to support both ends of the operation portion, and the accommodation member is wound around the pivot shaft and stored inside the housing when the operation portion approaches the pivot shaft, and is unwound from the pivot shaft and hung down to accommodate the medium when the operation portion is separated from the pivot shaft, and holds a weight on the other end side of an intermediate position between the one end and the other end in the advance and retreat direction.

According to the present aspect, the sheet-like accommodation member that accommodates the medium is wound around the pivot shaft and stored inside the housing when the operation portion approaches the pivot shaft, and is unwound from the pivot shaft and hung down to accommodate the medium when the operation portion is separated from the pivot shaft, and holds a weight at a place on the other end side of an intermediate position between the one end and the other end in the advance and retreat direction, that is, close to the operation portion in the advance and retreat direction. In an initial stage in which the accommodation member is unwound, it is easy for unwinding failure of the accommodation member to occur, but the weight is held at a place close to the operation portion in an advance and retreat direction, thereby making it possible to hang the accommodation member down while effectively unwinding the accommodation member from the pivot shaft using a gravity of the weight at the initial stage in which the accommodation member is unwound. Therefore, it is possible to preferably unwind the accommodation member.

A processing device according to a second aspect of the present disclosure is characterized in that, in the first aspect, the accommodation member has a bag portion, and the weight is stored in the bag portion.

According to the present aspect, the weight is stored in the bag portion of the accommodation member. Therefore, it is possible to curb coming-off of the weight from the accommodation member.

A processing device according to a third aspect of the present disclosure is characterized in that, in the second aspect, the weight is movable inside the bag.

According to the present aspect, the weight is movable inside the bag portion. With such a configuration, for example, when the accommodation member is unwound, it becomes possible to easily continue to position the weight downward in a vertical direction in the bag portion, and to particularly preferably unwind the accommodation member.

A processing device of a fourth aspect of the present disclosure is characterized by, in the second or third aspect, including: a plurality of the weights, wherein the plurality of weights are divided and stored in a plurality of bag portions.

According to the present aspect, the processing device includes the plurality of weights, and the weights are divided and stored in the plurality of bag portions. With such a configuration, for example, it is possible to unwind the accommodation member in a well-balanced manner in a width direction (an axial direction of the pivot shaft) intersecting the advance and retreat direction when unwinding the accommodation member.

A processing device of a fifth aspect of the present disclosure is characterized in that, in any one of the first to third aspects, the weight includes a metal.

According to the present aspect, the weight has a metal. Therefore, the weight can be made into a sturdy and small weight.

A processing device of a sixth aspect of the present disclosure is characterized in that, in any one of the first to third aspects, the weight has a rod-like shape.

According to the present aspect, the weight has a rod-like shape. With such a configuration, for example, it is possible to unwind the accommodation member in a well-balanced manner in a width direction (an axial direction of the pivot shaft) intersecting the advance and retreat direction when unwinding the accommodation member.

A processing device of a seventh aspect of the present disclosure is characterized in that, in any one of the first to third aspects, the weight has a spherical shape.

According to the present aspect, the weight has a spherical shape. With such a configuration, for example, when the accommodation member is unwound, it becomes possible to easily continue to position the weight downward in a vertical direction in the bag portion, and to particularly preferably unwind the accommodation member.

A processing device according to an eighth aspect of the present disclosure is characterized in that, in any one of the first to third aspects, at least part of a surface of the weight is a resin.

According to the present aspect, the at least part of the surface of the weight is a resin. Therefore, for example, when the unwound accommodation member collides with an installation surface of the processing device, the weight also collides with the installation surface via the accommodation member, making it possible to curb an increase in collision sound in this case.

A processing device according to a ninth aspect of the present disclosure is characterized in that, in the first aspect, the weight is a sheet member overlapped with and sewn to the accommodation member.

According to the present aspect, the weight is the sheet member overlapped with and sewn to the accommodation member. Therefore, it is possible to make the entire weight

100 flexible. Further, it is possible to form the weight without preparing another new constituent material by, for example, stacking and sewing the accommodation members to form the sheet member.

A processing device of a tenth aspect of the present disclosure is characterized in that, in the ninth aspect, a seam of the sheet member is formed in an axial direction of the pivot shaft.

According to the present aspect, the seams of the sheet member are formed in the axial direction of the pivot shaft. The flexibility becomes weaker and the accommodation member is easily distorted since a place at which the sheet member is overlapped and sewn is stiffer than other regions, but the seam is formed in the axial direction of the pivot shaft, thereby making it possible to curb the distortion of the accommodation member when viewed from a direction of gravity due to the weakened flexibility. The distortion of the accommodation member when viewed from the direction of gravity is curbed, thereby making it possible to unwind the accommodation member in a well-balanced manner in the width direction (the axial direction of the pivot shaft).

A processing device according to an eleventh aspect of the present disclosure is characterized by, in any one of the first to third aspects, further including: a rack provided on at least one of support portions in the pair; and a pivot shaft gear provided on the pivot shaft and configured to pivot in conjunction with movement of the rack.

According to the present aspect, the processing device includes the rack provided on the at least one of support portions in the pair, and the pivot shaft gear provided on the pivot shaft and configured to pivot in conjunction with movement of the rack. With such a configuration, it is possible to easily form a configuration in which the pivot shaft pivots in conjunction with the operation of the operation portion.

A processing device according to a twelfth aspect of the present disclosure is characterized by, in the eleventh aspect, including a speedup mechanism configured to speed up pivot of the pivot shaft gear and make an amount of unwinding of the accommodation member larger than an amount of movement of the pair of support portions, between the rack and the pivot shaft gear.

According to the present aspect, the speedup mechanism is included between the rack and the pivot shaft gear. With such a configuration, it is possible to eliminate a need for an increase in a size of the pivot shaft for winding the accommodation member, and to miniaturize the device.

A processing device according to a thirteenth aspect of the present disclosure is characterized in that, in any one of the first to third aspects, the pivot shaft is configured to be further pivotable half a turn or more from the position at which the amount of unwinding of the accommodation member can be maximized.

According to the present aspect, the pivot shaft is configured to be further pivotable by half a turn or more from the position at which the amount of unwinding of the accommodation member can be maximized. When the accommodation member is finally unwound, frictional resistance when the accommodation member comes into contact with a constituent member of the processing device tends to increase and it is difficult for the accommodation member to be unwound, but with such a configuration, it is possible to preferably unwind the accommodation member even when the accommodation member is finally unwound.

A recording device according to a fourteenth aspect of the present disclosure includes a recording unit accommodated in a housing and configured to perform recording on a medium; and a medium accommodation portion configured to accommodate the medium discharged from the housing, wherein the medium accommodation portion includes a flexible sheet-like accommodation member; a pivot shaft provided inside the housing, one end of the accommodation member being coupled to the pivot shaft; an operation portion to which the other end of the accommodation member is coupled and provided separably from the pivot shaft; and a pair of support portions advanceably and retreatably protruding from the housing in an advance and retreat direction in a separation direction from the pivot shaft of the operation portion, and configured to support both ends of the operation portion, and the accommodation member is wound around the pivot shaft and stored inside the housing when the operation portion approaches the pivot shaft, and is unwound from the pivot shaft and hung down to accommodate the medium when the operation portion is separated from the pivot shaft, and holds a weight on the other end side of an intermediate position between the one end and the other end in the advance and retreat direction.

According to the present aspect, the sheet-like accommodation member that accommodates the medium is wound around the pivot shaft and stored inside the housing when the operation portion approaches the pivot shaft, is unwound from the pivot shaft and hung down to accommodate the medium when the operation portion is separated from the pivot shaft, and holds a weight at a place on the other end side of an intermediate position between the one end and the other end in the advance and retreat direction, that is, close to the operation portion in the advance and retreat direction. In an initial stage in which the accommodation member is unwound, it is easy for unwinding failure of the accommodation member to occur, but the weight is held at a place close to the operation portion in an advance and retreat direction, thereby making it possible to hang the accommodation member down while effectively unwinding the accommodation member from the pivot shaft using a gravity of the weight at the initial stage in which the accommodation member is unwound. Therefore, it is possible to preferably unwind the accommodation member.

Example 1

Hereinafter, embodiments of the present disclosure will be specifically described with reference to the drawings. First, a schematic configuration of a recording device 10A of Example 1 as a recording device 10, which is a processing device according to an embodiment of the present disclosure, will be described with reference to FIGS. 1 to 9. For coordinates added to the drawing, it is assumed that the recording device 10A is placed on a horizontal installation surface, and three virtual axes perpendicular to one another are an X-axis, a Y-axis, and a Z-axis. The X-axis is a virtual axis parallel to a left-right direction of the recording device 10A. The Y-axis is a virtual axis parallel to a front-rear direction of the recording device 10A. The Z-axis is a virtual axis parallel to a height direction of the recording device 10A. It is assumed that a tip side of each of arrows indicating the X-axis, Y-axis and Z-axis is "+ side" and a base side thereof is a "− side". The recording device 10A includes a recording unit 30 that performs recording on a medium as a processing unit. The recording device 10A of the present embodiment is a large-format printer that unwinds a long medium 22 wound in a roll shape and performs recording in an ink jet scheme. The large-format printer is a printer capable of performing printing on a long medium having a width of 297 mm or more, which corresponds to a short side width of an A3 size.

Figure 2:
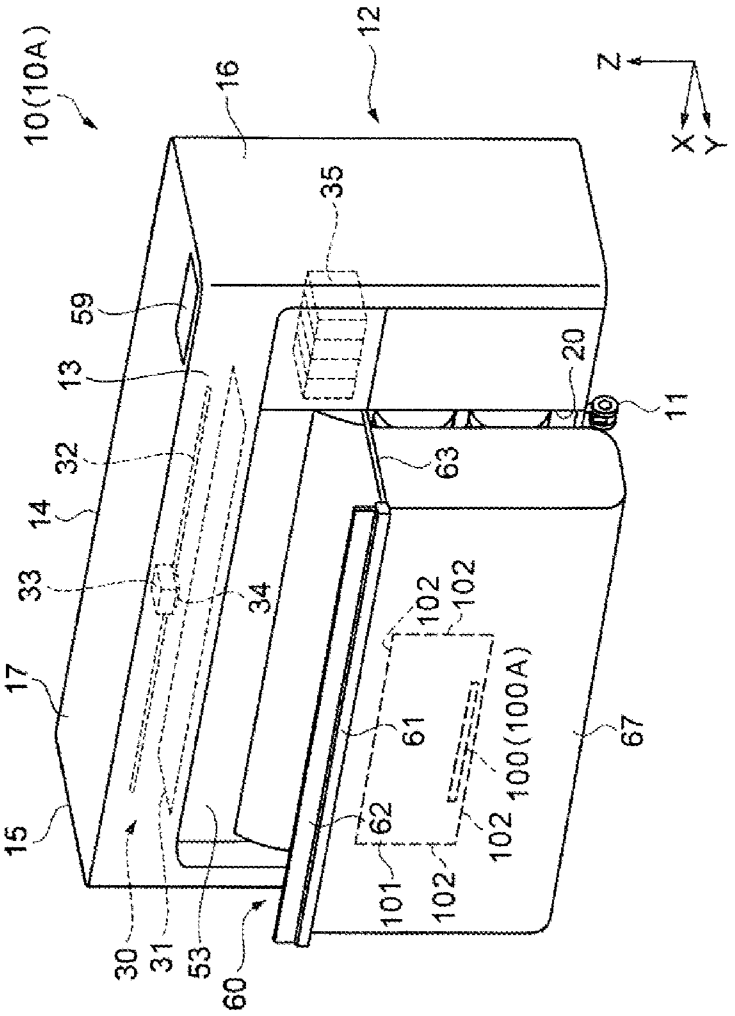
FIG. 2 is a perspective view illustrating the recording device according to Example 1 in a state (separated state) when the operation portion is furthest away from the front wall of the housing.
Figure 3:
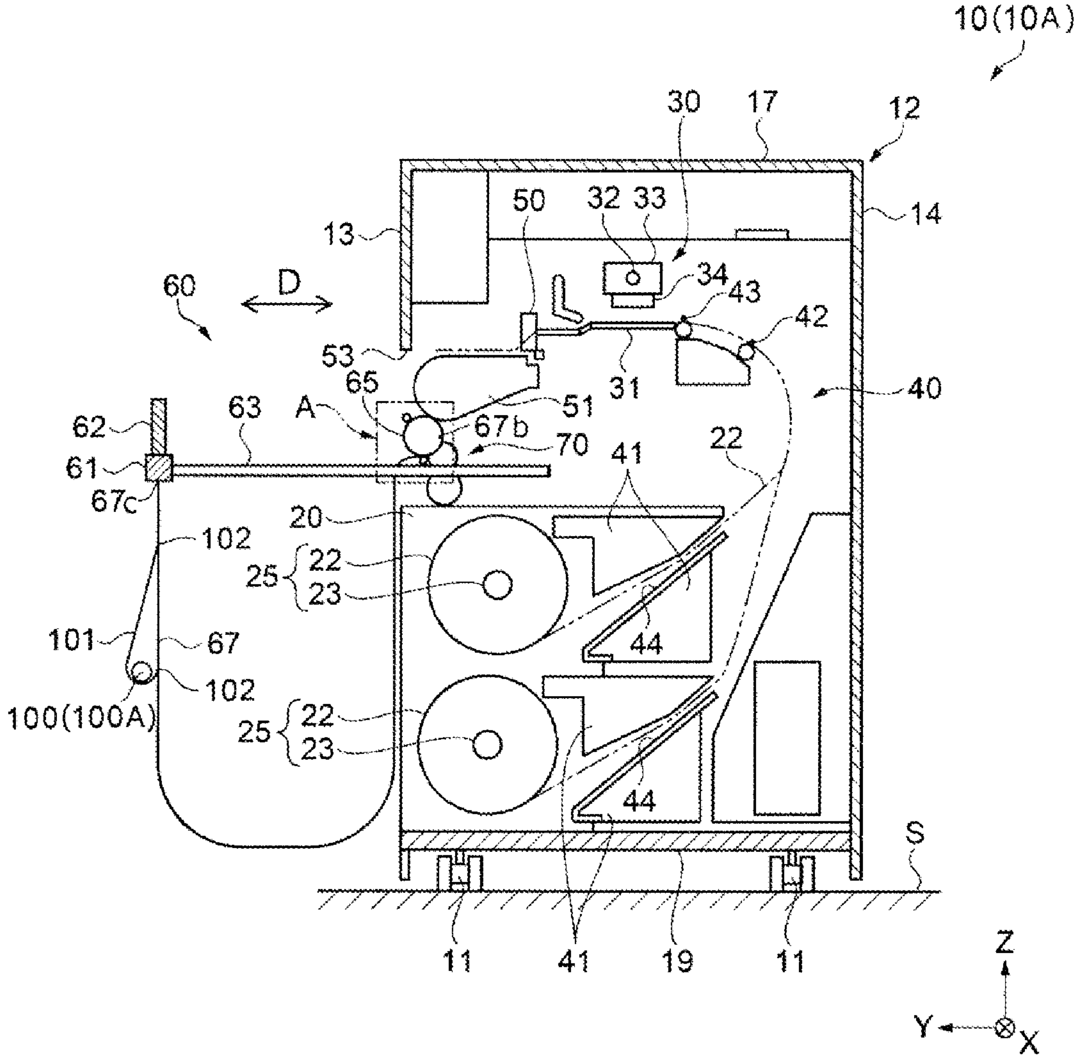
FIG. 3 is a cross-sectional view illustrating an internal configuration of a recording device according to Example 1, and is a view illustrating a separated state.

As illustrated in FIGS. 1, 2, and 3, the recording device 10A is housed in a housing 12, and includes the recording unit 30 that performs recording on a medium 22, and a medium accommodation portion 60 that receives the medium 22 discharged from the housing 12.

The recording device 10A includes a substantially rectangular parallelepiped housing 12 elongated in the left-right direction. The housing 12 has a front wall 13, a rear wall 14, a first side wall 15, a second side wall 16, and a upper wall 17. The housing 12 is coupled to a base frame 19 supported by leg portions 11. The recording device 10A is installed on an installation surface S via the leg portions 11. In the recording device 10A, a Z direction in which the base frame 19 and the upper wall 17 face each other is a height direction of the recording device 10A. An X direction in which the first side wall 15 and the second side wall 16 face each other is a left-right direction of the recording device 10A. A Y direction in which the front wall 13 and the rear wall 14 face each other is the front-rear direction of the recording device 10A. When the recording device 10A is disposed on a horizontal plane, the Z direction is a direction parallel to a vertical line. The X direction corresponds to the width direction and also corresponds to an axial direction of a pivot shaft 65 to be described below.

Inside the housing 12, the accommodation portion 20 that accommodates a roll body 25 on which the medium 22 is cylindrically wound, a transport unit 40 that transports the medium 22, and a cutting unit 50 that cuts the medium 22 are provided, in addition to the recording unit 30 that performs recording on the medium 22.

A plurality of openings are formed in the front wall 13 of the housing 12. A roll body accommodation port 27 for accommodating the roll bodies 25 is formed on the base frame 19 side in a lower portion of the front wall 13. Further, an opening 53 having functions of a paper discharge port for discharging the medium 22 on which the recording has been performed, and an unwinding port for unwinding an accommodation member 67 (described below) that accommodates the discharged medium 22 is formed above the roll body accommodation port 27. The medium 22 is discharged from an upper portion side of the opening 53, and the accommodation member 67 is unwound from a lower portion side of the opening 53. In the present embodiment, although a configuration in which the paper discharge port and the unwinding port are formed as one opening 53 has been illustrated, a configuration in which the paper discharge port and the unwinding port are provided independently may be adopted.

The cylindrical roll body 25 formed by winding the long medium 22 around a core member 23 is detachably accommodated in the accommodation portion 20 from the roll body accommodation port 27. In the present embodiment, the accommodation portion 20 is configured to be able to accommodate two roll bodies 25 that are long in the X direction in a state in which the roll bodies 25 are arranged side by side in the Z direction. A pair of holding members 28 that hold the roll body 25 rotatably with respect to the accommodation portion 20 are attached to both ends of the roll body 25. The roll body 25 is rotated and driven, and the medium 22 wound around the roll body 25 is sent to the rear wall 14 side inside the housing 12.

The transport unit 40 transports the medium 22 sent from the roll body 25. The transport unit 40 includes a transport path forming unit 41, an intermediate roller 42, and a transport roller 43. The transport path forming unit 41 is provided to correspond to each of the two roll bodies 25. The transport path forming unit 41 is located on the rear wall 14 side with respect to each of the two roll bodies 25 accommodated in the accommodation portion 20. The transport path forming unit 41 forms a transport path 44 that guides the medium 22 sent from the roll body 25 by rotational driving of the roll body 25 to the rear wall 14 side of the housing 12.

The intermediate roller 42 and the transport roller 43 transport the medium 22 that has passed through the transport path 44, to the recording unit 30. The intermediate roller 42 and the transport roller 43 are configured of a driving roller and a driven roller, which are a pair of rollers supported rotatably about an axis in the X direction as a pivot shaft. The intermediate roller 42 and the transport roller 43 hold the medium 22 by sandwiching the medium 22 from both front and back surfaces with the driving roller and the driven roller. The driving rollers of the intermediate roller 42 and the transport roller 43 are rotated and driven, so that the medium 22 is transported to a support base 31 through the transport path 44, and is transported from the rear wall 14 side to the front wall 13 side on the support base 31. Although FIG. 3 illustrates a state in which the medium 22 is sent from both of the two roll bodies 25, the medium 22 is sent from any one of the two roll bodies 25 at the time of actual recording.

The recording unit 30 includes the support base 31, a guide shaft 32, a carriage 33 and a recording head 34. The support base 31 is located to the upper wall 17 relative to the accommodation portion 20. The support base 31 is a plate-like member extending in the X direction inside the housing 12 and supports the medium 22 transported by the transport unit 40. The guide shaft 32 is located on the upper wall 17 side relative to the support base 31. The guide shaft 32 is a rod-like member extending in the X direction. The guide shaft 32 slidably supports the carriage 33.

The recording head 34 is mounted on the carriage 33. The recording head 34 is located on the support base 31 side with respect to the carriage 33. The recording head 34 is configured to be reciprocally movable along the guide shaft 32 together with the carriage 33. The recording head 34 is coupled to a cartridge 35 having ink accommodated therein by a flexible tube (not illustrated). The cartridge 35 is stored at a position on the second side wall 16 relative to the accommodation portion 20, which is a position on the upper wall 17 side relative to the accommodation portion 20. The recording head 34 performs recording on the medium 22 by ejecting ink onto the medium 22 supported by the support base 31 while moving in the X direction.

The cutting unit 50 is located on the front wall 13 side relative to the recording unit 30. The cutting unit 50 includes a fixed blade, and a movable blade that is movable with respect to the fixed blade, and cuts the medium 22 located between the fixed blade and the movable blade. The cut medium 22 is supported by a paper discharge port member 51 that guides the medium 22 to the upper portion side of the opening 53 formed in the front wall 13 and is discharged to the outside of the housing 12.

Further, the recording device 10A includes an input unit 59. The input unit 59 is provided on an upper surface of the upper wall 17 of the housing 12. The input unit 59 is located at a corner portion formed by a portion in which the front wall 13 is coupled to the upper wall 17 and a portion in which the second side wall 16 is coupled to the upper wall 17. The input unit 59 is configured of, for example, a liquid crystal display device having a touch panel, and is used when the user inputs various types of information.

As illustrated in FIG. 3 and the like, the medium accommodation portion 60 includes an operation portion 61, a support portion 63, the pivot shaft 65, an accommodation member 67, and the like. The pivot shaft 65 is provided inside the housing 12 and between the accommodation portion 20 and the paper discharge port member 51. The pivot shaft 65 has a cylindrical shape elongated in the X direction, and has a length greater than the width of the medium 22. The pivot shaft 65 is pivotably supported with respect to the housing 12.

The operation portion 61 is a rod-like member elongated in the X direction. Both ends of the operation portion 61 are supported by a pair of support portions 63 that protrude to be able to advance and retreat in the +Y direction from the front wall 13 side of the housing 12. A pair of support portions 63 protrude outside the housing 12 from between the pivot shaft 65 and the accommodation portion 20. That is, the operation portion 61 can be separated from the housing 12, and can be displaced between a mounted state in which the operation portion 61 is mounted in the housing 12 and a separated state in which the operation portion 61 is separated from the housing 12 as the pair of support portions 63 advance and retreat.

The accommodation member 67 is a flexible, elongated sheet-like member. As illustrated in FIGS. 3 to 6, one end 67*b* of the accommodation member 67 is coupled to the pivot shaft 65, and the other end 67*c* of the accommodation member 67 is coupled to a coupling portion 61*a* of the operation portion 61. The pivot shaft 65 is configured to rotate forward or backward in conjunction with the advance and retreat of the support portion 63. Here, as illustrated in FIGS. 2 to 5, a bag portion 101 is attached to the accommodation member 67, and a rod-like weight 100A is stored as the weight 100 in the bag portion 101.

Figure 7:
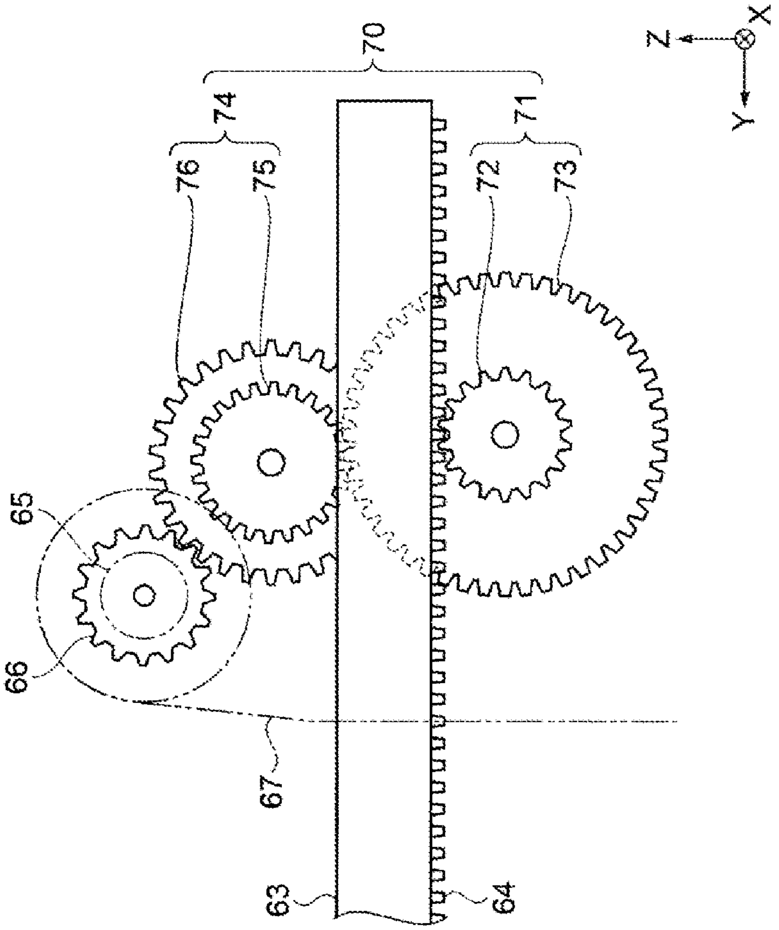
FIG. 7 is a plan view of a power transmission configuration between a supporting portion and a pivot shaft of the recording device of Example 1, when viewed from a side.
Figure 8:
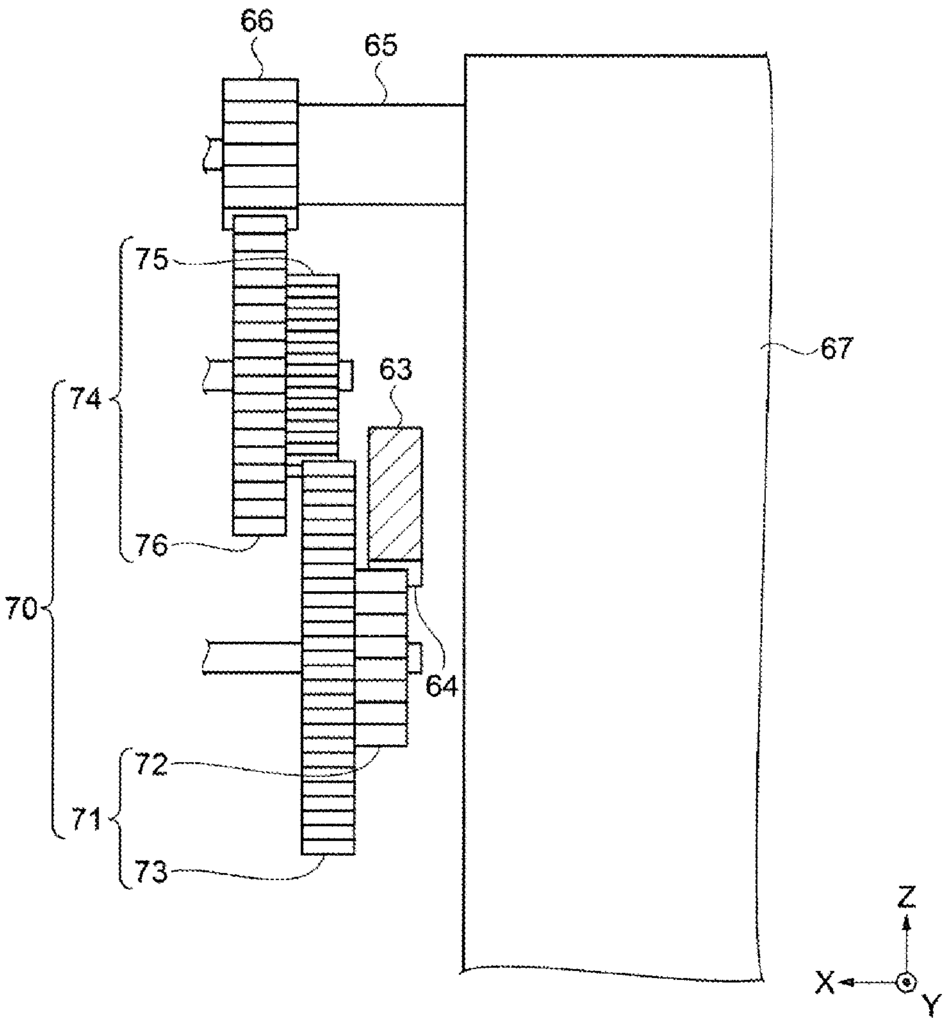
FIG. 8 is a plan view of the power transmission configuration between the supporting portion and the pivot shaft of the recording device of Example 1, when viewed from the front.

As illustrated in FIGS. 7 and 8, at least one of support portions 63 in the pair is provided with a rack 64. The rack 64 is a rack in which a plurality of teeth are cut at equal pitches in a flat bar. In the recording device 10 of the present embodiment, the rack 64 is provided on the −Z side surfaces of both the support portions 63. On the other hand, the pivot shaft 65 is provided with a pivot shaft gear 66 that rotates in conjunction with the movement of the rack 64. Further, a speedup mechanism 70 that speeds up pivot of the pivot shaft gear 66 is provided between the rack 64 and the pivot shaft gear 66.

The speedup mechanism 70 includes a first compound gear 71 and a second compound gear 74 as compound gears in which gears having different numbers of teeth are stacked. In the first compound gear 71, a first gear 72 that meshes with the rack 64 and a second gear 73 having a larger diameter and a larger number of teeth than the first gear 72 are formed on the same shaft. The rack 64 engages with the first gear 72, such that a linear movement according to the advance and retreat of the support portion 63 is converted into rotational force of the first compound gear 71. In the second compound gear 74, a third gear 75 engaging with the second gear 73 and having a smaller diameter and a smaller number of teeth than the second gear 73, and a fourth gear 76 having a larger diameter and a larger number of teeth than the third gear 75 are formed on the same shaft.

For example, when the number of teeth of the second gear 73 is twice the number of teeth of the first gear 72, the third gear 75 engaging with the second gear 73 rotates at twice the speed as compared with a case in which the first gear 72 directly engages with the third gear 75. That is, the first compound gear 71 speeds up the rotation of the second compound gear 74. Similarly, the second compound gear 74 speeds up the rotation of the pivot shaft gear 66. In the present embodiment, although the speedup mechanism 70 configured of the two compound gears including the first compound gear 71 and the second compound gear 74 has been illustrated, the speedup mechanism 70 may be configured of one compound gear or three or more compound gears. Further, a speedup mechanism configured by combining a plurality of large and small spur gears having different diameters and numbers of teeth may be adopted.

Figure 4:
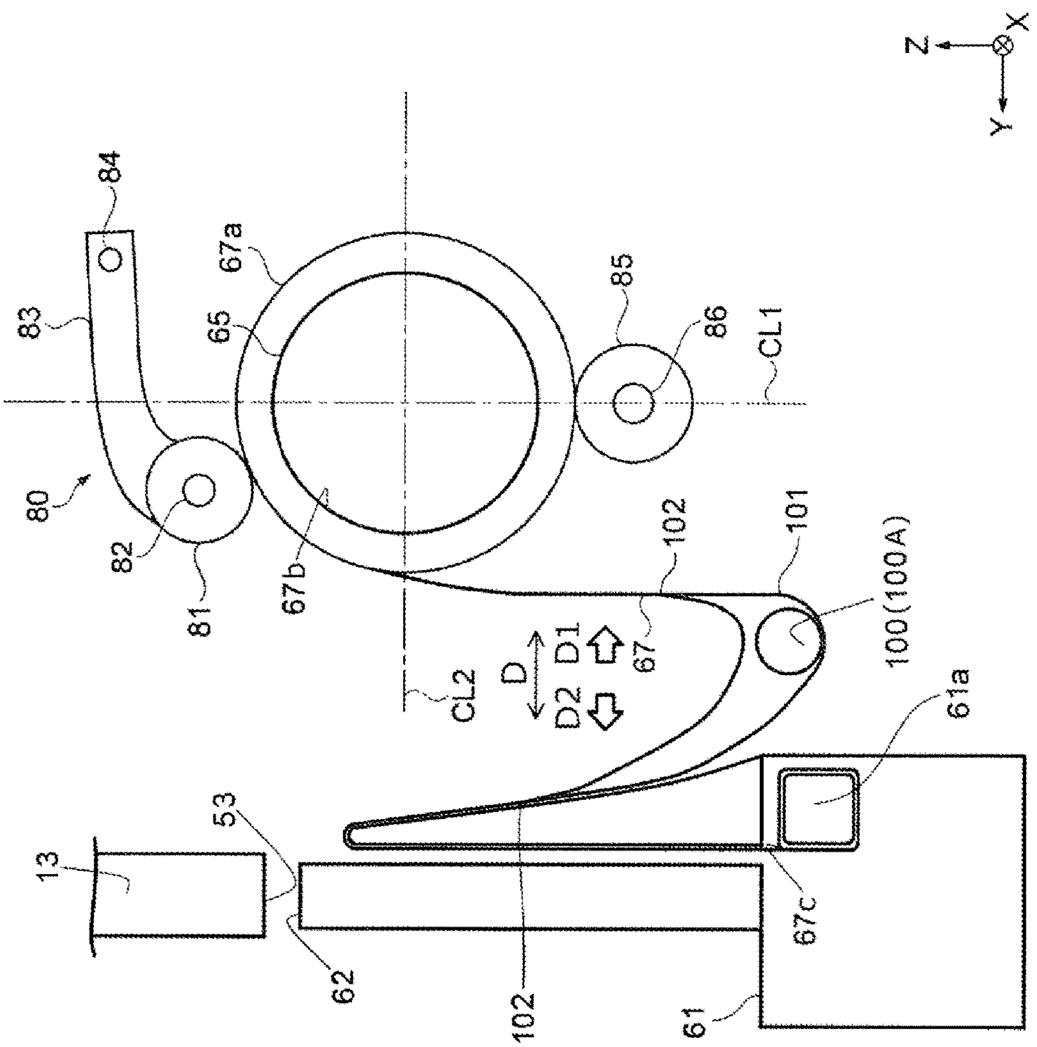
FIG. 4 is an enlarged view illustrating a portion corresponding to a region A in FIG. 3, and is a view illustrating a mounted state.
Figure 5:
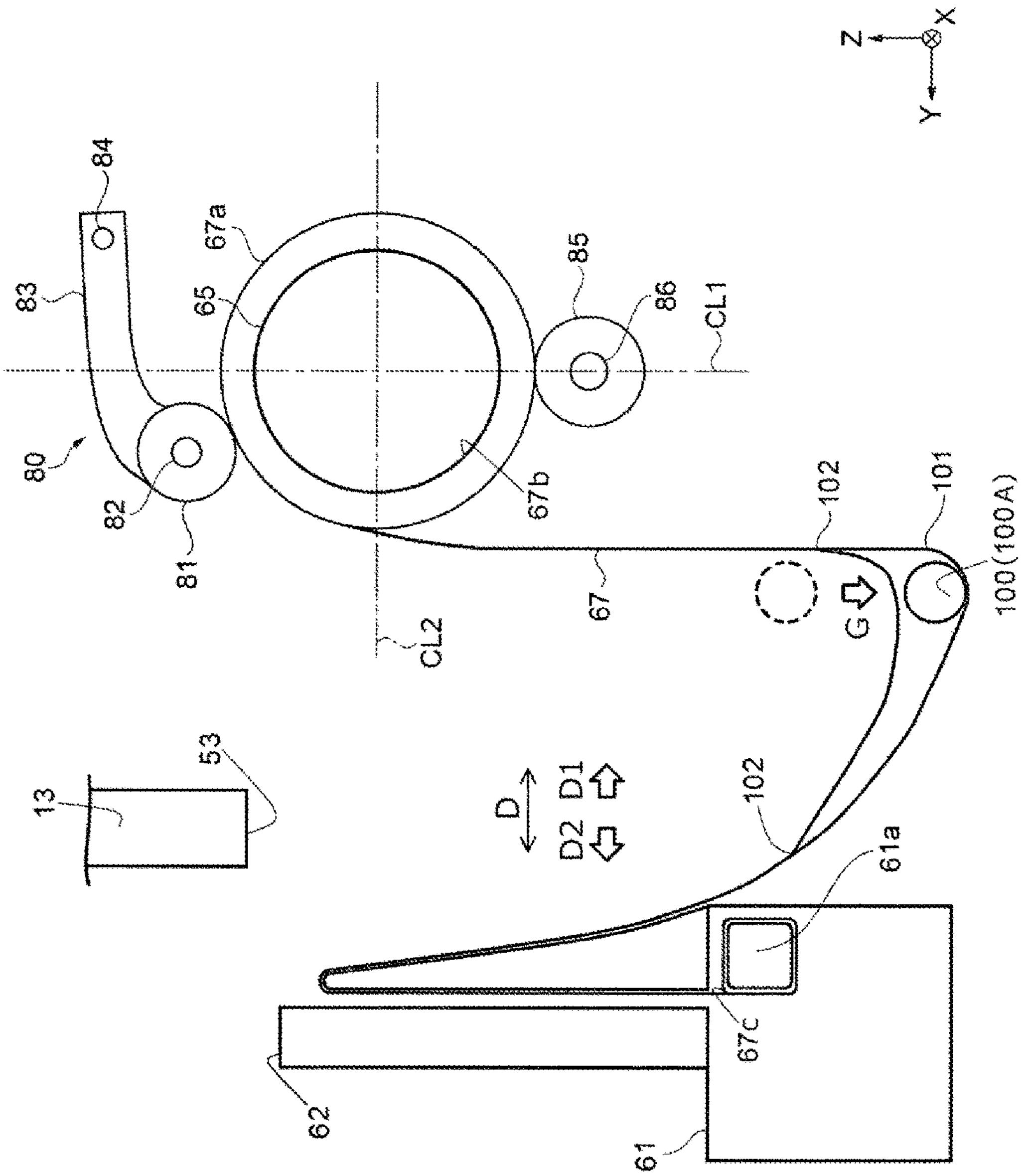
FIG. 5 is an enlarged view illustrating the portion corresponding to the region A in FIG. 3, and is a view illustrating a state when the operation portion starts to move away from the front wall of the housing from the state of FIG. 4 (a separation start state)
Figure 6:
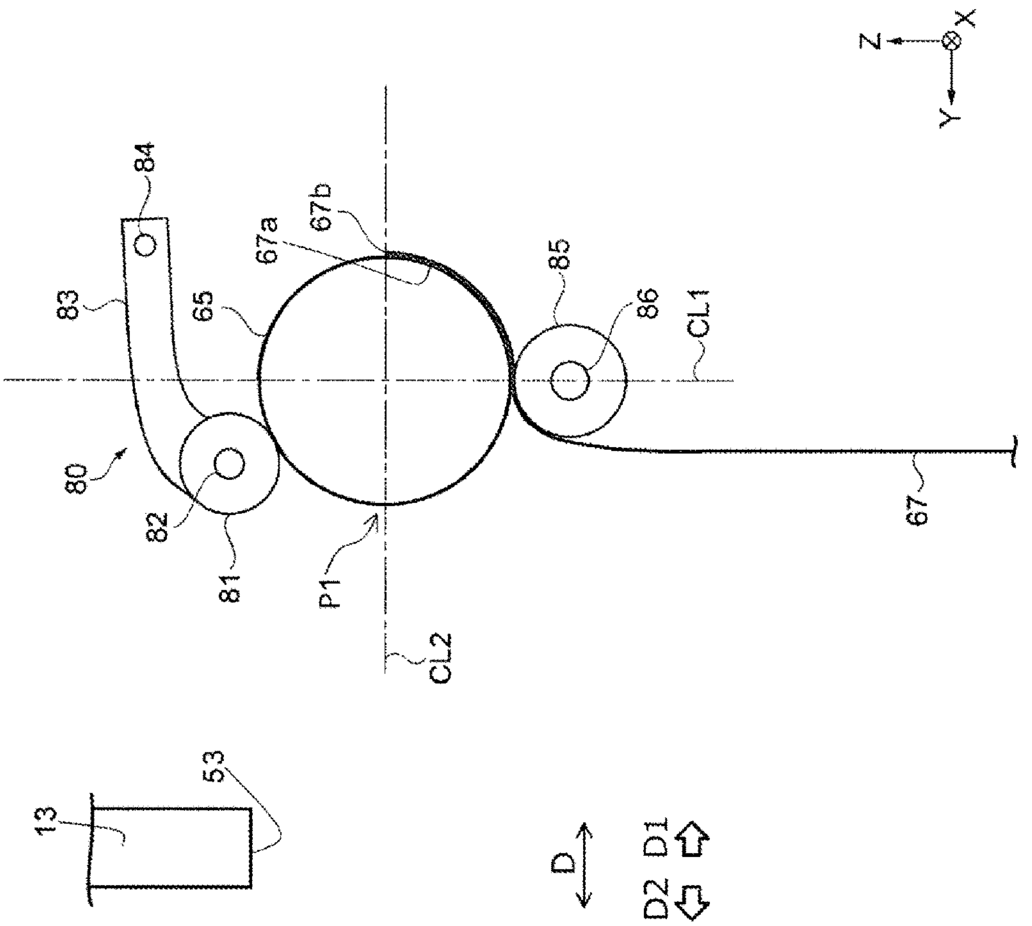
FIG. 6 is an enlarged view illustrating the portion corresponding to region A in FIG. 3, and is a view illustrating a separated state.

The accommodation member 67 is wound around the pivot shaft 65 and accommodated inside the housing 12 when the operation portion 61 is displaced from the separated state illustrated in FIGS. 3 and 6 to the mounted state illustrated in FIG. 4 via the state illustrated in FIG. 5. Further, the accommodation member 67 is unwound to the outside of the housing 12 through the lower portion side of the opening 53 from the pivot shaft 65 and enters a state in which the accommodation member 67 can accommodate the medium 22 discharged from the upper portion side of the opening 53 when the operation portion 61 is displaced from the mounted state illustrated in FIG. 4 to the separated state illustrated in FIGS. 3 and 6 via the state of FIG. 5. The recording device 10 of the present embodiment is configured so that the amount of unwinding of the accommodation member 67 unwound from the pivot shaft 65 becomes larger than the amount of movement of the pair of support portions 63 in the +Y direction by the speedup mechanism 70. Accordingly, the accommodation member 67 forms slackness between the operation portion 61 and the pivot shaft 65.

The operation portion 61 includes a front plate 62 forming a part of the front wall 13 of the housing 12 in a mounted state illustrated in FIG. 4. The front plate 62 is a plate-like member long in the X direction, which rises in the +Z direction from the operation portion 61. At least a portion of the opening 53 is closed by the front plate 62 in a state in which the operation portion 61 is mounted. The front plate 62 forms the same plane as the front wall 13 in the mounted state, as illustrated in FIG. 4. In the present embodiment, the lower portion of the opening 53 through which the accommodation member 67 is unwound is closed by the front plate 62.

In the present embodiment, a configuration in which the speedup mechanism 70 is used to make the amount of unwinding of the accommodation member 67 becomes larger than an amount of movement of the support portion 63 has been illustrated, but the present disclosure is not limited thereto. For example, a pivot shaft having an outer circumference longer than the amount of movement of the support portion 63 required for one rotation of the pivot shaft is used so that a configuration in which the amount of unwinding of the accommodation member 67 is larger than the amount of movement of the support portion 63 can be realized.

As illustrated in FIGS. 4 to 6, the medium accommodation portion 60 includes an abutment unit 80 and an auxiliary roller 85. The abutment unit 80 abuts on an outer peripheral surface 67*a* of the roll-like accommodation member 67 wound around the pivot shaft 65 and presses the accommodation member 67 against the pivot shaft 65. The abutment unit 80 is provided at both end portions in an axis line direction, that is, in the X direction of the pivot shaft 65.

The abutment unit 80 includes an abutment roller 81 and an arm 83. The abutment roller 81 is a driven roller that abuts on and follows the outer peripheral surface 67*a* of the accommodation member 67 that pivots together with the pivot shaft 65 when the accommodation member 67 is wound around or unwound by the pivot shaft 65. The arm 83 is located above the pivot shaft 65. One end of the arm 83 is located in a −Y direction from a vertical line CL1 that intersects an axis line of the pivot shaft 65, and is pivotably supported by an arm shaft 84 extending in the X direction. The other end of the arm 83 is located in the +Y direction from the vertical line CL1 and rotatably supports the abutment roller 81 via an abutment roller shaft 82. That is, the abutment roller 81 abuts on the roll-like accommodation member 67 between a straight line directed in the +Z direction from the axis line of the pivot shaft 65 in the vertical line CL1 and a straight line directed in the +Y direction from the axis line of the pivot shaft 65 in a horizontal line CL2 intersecting the axis line of the pivot shaft 65.

The abutment roller 81 presses the roll-like accommodation member 67 wound around the pivot shaft 65 against the pivot shaft 65 using a pressing member (not illustrated) that presses the arm 83 downward. This makes it possible to cause the abutment roller 81 to abut on the outer peripheral surface 67*a* of the accommodation member 67 according to a radius of the roll-like accommodation member 67 that changes according to the pivot of the pivot shaft 65. In the present embodiment, although a configuration in which the abutment unit 80 is provided at both end portions of the pivot shaft 65 has been illustrated, a configuration in which a plurality of abutment units are provided, in addition to both the end portions, may be adopted.

The auxiliary roller 85 abuts on the outer peripheral surface 67*a* of the roll-like accommodation member 67 wound around the pivot shaft 65 to press the accommodation member 67 against the pivot shaft 65. The auxiliary roller 85 is a driven roller that abuts on and follows the outer peripheral surface 67*a* of the accommodation member 67 that pivots when accommodation member 67 is wound or unwound around the pivot shaft 65. The auxiliary roller 85 is located under the horizontal line CL2 that intersects the axis line of the pivot shaft 65 and is supported pivotably via an auxiliary roller shaft 86. Further, it is desirable for the auxiliary roller 85 to be provided at a position overlapping the vertical line CL1 that intersects with the axis line of the pivot shaft 65.

The auxiliary roller 85 presses the roll-like accommodation member 67 wound around the pivot shaft 65 against the pivot shaft 65 using a pressing member that presses the auxiliary roller shaft 86 upward. This makes it possible to cause the auxiliary roller 85 to abut on the outer peripheral surface 67*a* of the accommodation member 67 according to the radius of the roll-like accommodation member 67 that changes according to the pivot of the pivot shaft 65. One or more auxiliary rollers 85 are provided in the X direction of the pivot shaft 65.

The abutment roller 81 and the auxiliary roller 85 press the accommodation member 67 against the pivot shaft 65, so that the rotation of the pivot shaft 65 is easily transmitted not only to the accommodation member 67 close to the pivot shaft 65 but also to the outer peripheral surface 67*a* side. However, in the present embodiment, the accommodation member 67 is always pulled downward by the weight 100, and the accommodation member 67 of the outer peripheral surface 67*a* is under tension to be attracted toward the pivot shaft 65. Therefore, it is possible to unwind the accommodation member 67 normally without providing the abutment roller 81 and the auxiliary roller 85. When the abutment roller 81 and the auxiliary roller 85 are not provided, parts incidental to the abutment roller 81 and the auxiliary roller 85 are also unnecessary, and a cost can be reduced. Further, since sound when the abutment roller 81 and the auxiliary roller 85 rotate according to the unwinding or winding of the accommodation member 67 is not generated, noise is also reduced.

In the present embodiment, the recording device 10A as a processing device including the recording unit 30 that performs recording in an ink jet scheme as a processing unit has been illustrated, but the present disclosure is not limited thereto. The processing device may be a recording device other than an inkjet scheme, a copying device, a facsimile device, a multi-function device having a plurality of functions thereof, or the like.

As described above, the recording device 10A is housed in the housing 12 and includes the recording unit 30 as a processing unit that processes the medium 22, and the medium accommodation portion 60 that receives the medium 22 discharged from the housing 12. The medium accommodation portion 60 includes the flexible sheet-like accommodation member 67, the pivot shaft 65 provided inside the housing 12 and having the one end 67*b* of the accommodation member 67 coupled thereto, the operation portion 61 having the other end 67*c* of the accommodation member 67 coupled thereto and provided to be separated from the pivot shaft 65, and the pair of support portions 63 that protrudes to be advanced or retreated from the housing 12 in an advance and retreat direction D illustrated in FIGS. 3 to 6 in a separation direction (+Y direction) from the pivot shaft 65 of the operation portion 61 to support both the ends of the operation portion 61. Further, the medium accommodation portion 60 includes the rack 64 provided on at least one of the support portions 63 in the pair, and the pivot shaft gear 66 that is provided on the pivot shaft 65 and pivots in conjunction with the rack 64, as illustrated in FIGS. 7 and 8. A direction D1 in the advance and retreat direction D in FIGS. 4 to 6 corresponds to a direction in which the operation portion 61 enters the housing 12, and a direction D2 in the advance and retreat direction D in FIGS. 4 to 6 corresponds to a direction in which the operation portion 61 moves away from the housing 12.

Any mechanism other than a mechanism in which the rack 64 and the pivot shaft gear 66 are combined can be adopted as long as the pivot shaft 65 pivots with a movement of the operation portion 61. For example, a configuration in which the operation portion 61 is supported by one end of a rod-like guide member serving as a support portion, and the other end of the rod-like guide member is supported by the housing 12 may be adopted. In this case, when the operation portion 61 approaches or separates from the housing 12, the other end of the rod-like guide member supported by the housing 12 operates to pivot as a fulcrum, and the pivot of the pivot shaft 65 may be interlocked with a rotation operation of the rod-like guide member.

Here, the medium accommodation portion 60 will be described focusing on the accommodation member 67 in greater detail. The accommodation member 67 of the present embodiment is wound around the pivot shaft 65 and stored inside the housing 12 when the operation portion 61 approaches the pivot shaft 65, and is unwound from the pivot shaft 65 and hung down to be able to accommodate the medium 22 when the operation portion 61 is separated from the pivot shaft 65. This makes it possible receive the medium accommodation portion 60 in a narrow space, and provide a processing device with a reduced size.

The weight 100A is held at a place closer to the other end 67*c* relative to an intermediate position between the one end 67*b* and the other end 67*c* in the advance and retreat direction D, that is, closer to the operation portion 61 in the advance and retreat direction D. "Closer to the other end 67$c$ relative to the intermediate position between the one end 67$b$ and the other end 67$c$ in the advance and retreat direction D" means "closer to the other end 67$c$ relative to the intermediate position between the one end 67$b$ and the other end 67$c$ in an entire length of the accommodation member 67 from the one end 67$b$ to the other end 67$c$", as illustrated in FIG. 3. In the initial stage in which the accommodation member 67 is unwound, it is easy for unwinding failure of the accommodation member 67 to occur, but the weight 100A is held at a place closer to the operation portion 61 in the advance and retreat direction D as can be seen from FIGS. 4 and 5, making it possible to hang the accommodation member 67 down while effectively unwinding the accommodation member 67 from the pivot shaft 65 using a gravity G of the weight 100A at an initial stage in which the operation portion 61 is separated from the pivot shaft 65 and the accommodation member 67 is unwound. Therefore, the recording device 10A can curb the accommodation member 67 jumping up vigorously in the +Y direction over the operation portion 61 and being caught by the operation portion 61 in the initial stage in which the accommodation member 67 is unwound, and preferably unwind the accommodation member 67 as illustrated in FIG. 3.

Further, as illustrated in FIGS. 3 to 5, in the recording device 10A, the accommodation member 67 includes the bag portion 101, and the weight 100A is stored in the bag portion 101. Therefore, the recording device 10A is configured to curb coming-off of the weight 100A from the accommodation member 67. The "bag portion" may have at least regions closed in a facing direction, the number or disposition of open regions are not particularly limited, and there may be no open region like the bag portion 101 in the recording device 10A of the present embodiment.

Figure 9:
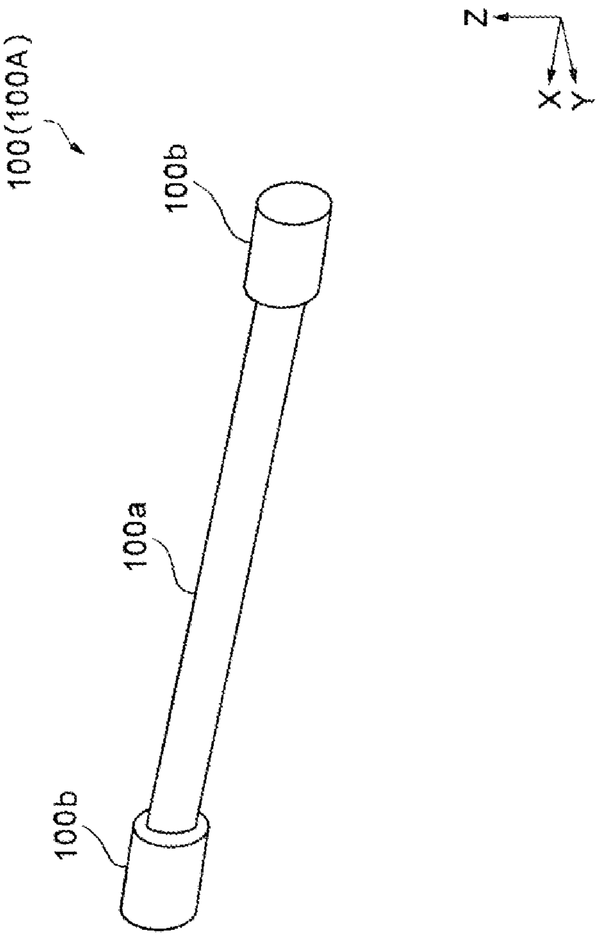
FIG. 9 is a perspective view illustrating a weight of the recording device of Example 1.

Here, the weight 100A in the recording device 10A of the present embodiment has a rod-like shape as illustrated in FIG. 9, and is stored in the bag portion 101 so that a longitudinal direction is the X direction. The weight 100 is made bar-like, for example, thereby making it possible to unwind the accommodation member 67 in a well-balanced manner in a width direction (an X direction corresponding to the axial direction of the pivot shaft) that intersects with the advance and retreat direction D when the accommodation member 67 is unwound. A rotation direction of the pivot shaft 65 when the accommodation member 67 is unwound in an order illustrated in FIGS. 4, 5, and 6 is counterclockwise in FIGS. 4 to 6. Conversely, the rotation direction of the pivot shaft 65 when the accommodation member 67 is wound around the pivot shaft 65 in an order illustrated in FIGS. 6, 5 and 4 is clockwise in FIGS. 4 to 6.

Further, the bag portion 101 in the recording device 10A of the present embodiment is a rectangular sheet member sewn to the accommodation member 67 at a seam 102 (a portion indicated by a broken line in the bag portion 101). The weight 100A is movable inside the bag portion 101. With such a configuration, for example, when the accommodation member 67 is unwound, it becomes possible to easily continue to position the weight 100 downward in a vertical direction in the bag portion 101, and to particularly preferably unwind the accommodation member 67.

As illustrated in FIG. 9, the weight 100A includes a rod-like portion 100$a$ and cap portions 100$b$ attached to both ends of the rod-like portion 100$a$. Here, the rod-like portion 100$a$ is made of metal. Thus, the weight 100A has a metal. Therefore, the weight 100A can be made into a sturdy and small weight 100.

On the other hand, the cap portion 100$b$ is a resin. That is, at least part of a surface of the weight 100A is a resin. With such a configuration, for example, when the unwound accommodation member 67 collides with the installation surface S, the weight 100A also collides with the installation surface S via the accommodation member 67, but it is possible to curb an increase in collision sound in this case.

Further, as described above, the recording device 10A of the present embodiment includes the rack 64 provided on at least one of the support portions 63 in the pair, and the pivot shaft gear 66 that is provided on the pivot shaft 65 and rotates in conjunction with the rack 64. Further, the speedup mechanism 70 that speeds up rotation of the pivot shaft gear 66 to make the amount of unwinding of the accommodation member 67 larger than the amount of movement of the pair of support portions 63 is provided between the rack 64 and the pivot shaft gear 66. With such a configuration, it is possible to easily form a configuration in which the pivot shaft 65 rotates in conjunction with the operation of the operation portion 61, to eliminate a need for an increase a size of the pivot shaft 65 for winding the accommodation member 67, and to miniaturize the device.

Here, in the recording device 10A of the present embodiment, the pivot shaft 65 is configured to be further rotated by half a turn from a position P1 at which the amount of unwinding of the accommodation member 67 can be maximized when the operation portion 61 most moves away from with respect to the front wall 13 of the housing 12, as illustrated in FIG. 6. Thus, it is preferable for the pivot shaft 65 to be configured to be further pivotable half a turn or more from the position P1 at which the amount of unwinding of the accommodation member 67 can be maximized. When the accommodation member 67 is finally unwound, frictional resistance when the accommodation member 67 comes into contact with a constituent member of the processing device 10 tends to increase and it is difficult for the accommodation member 67 to be unwound, thereby making it possible to preferably unwind the accommodation member 67 even when the accommodation member 67 is finally unwound.

Example 2

Figure 10:
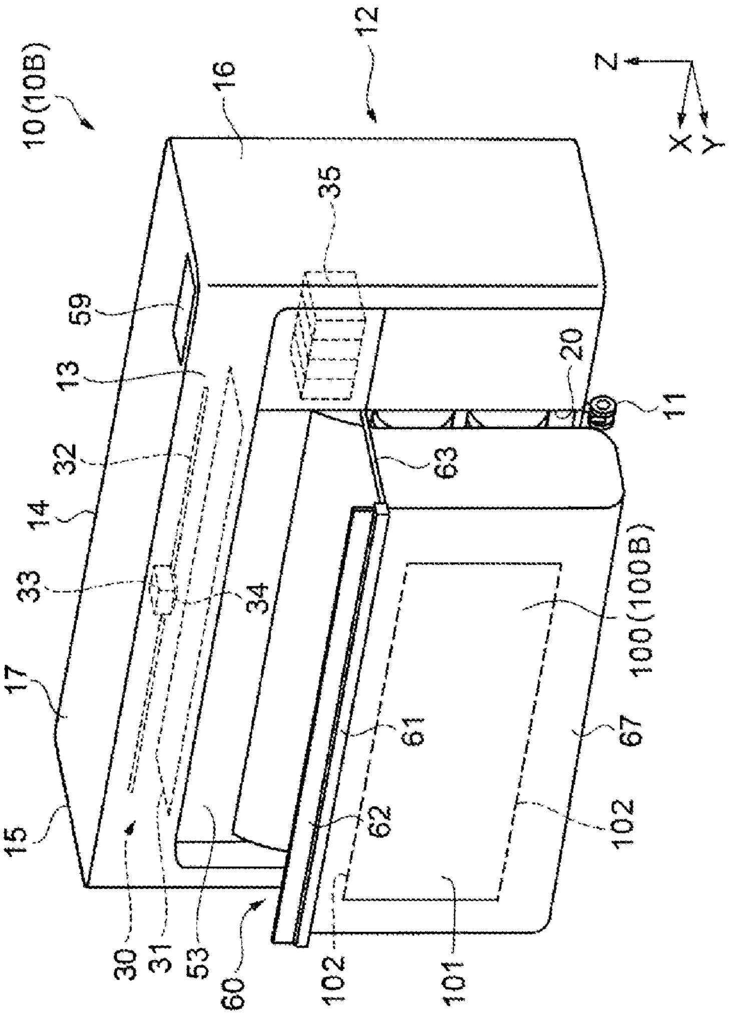
FIG. 10 is a perspective view illustrating a configuration of a recording device of Example 2 as the processing device according to an embodiment.
Figure 11:
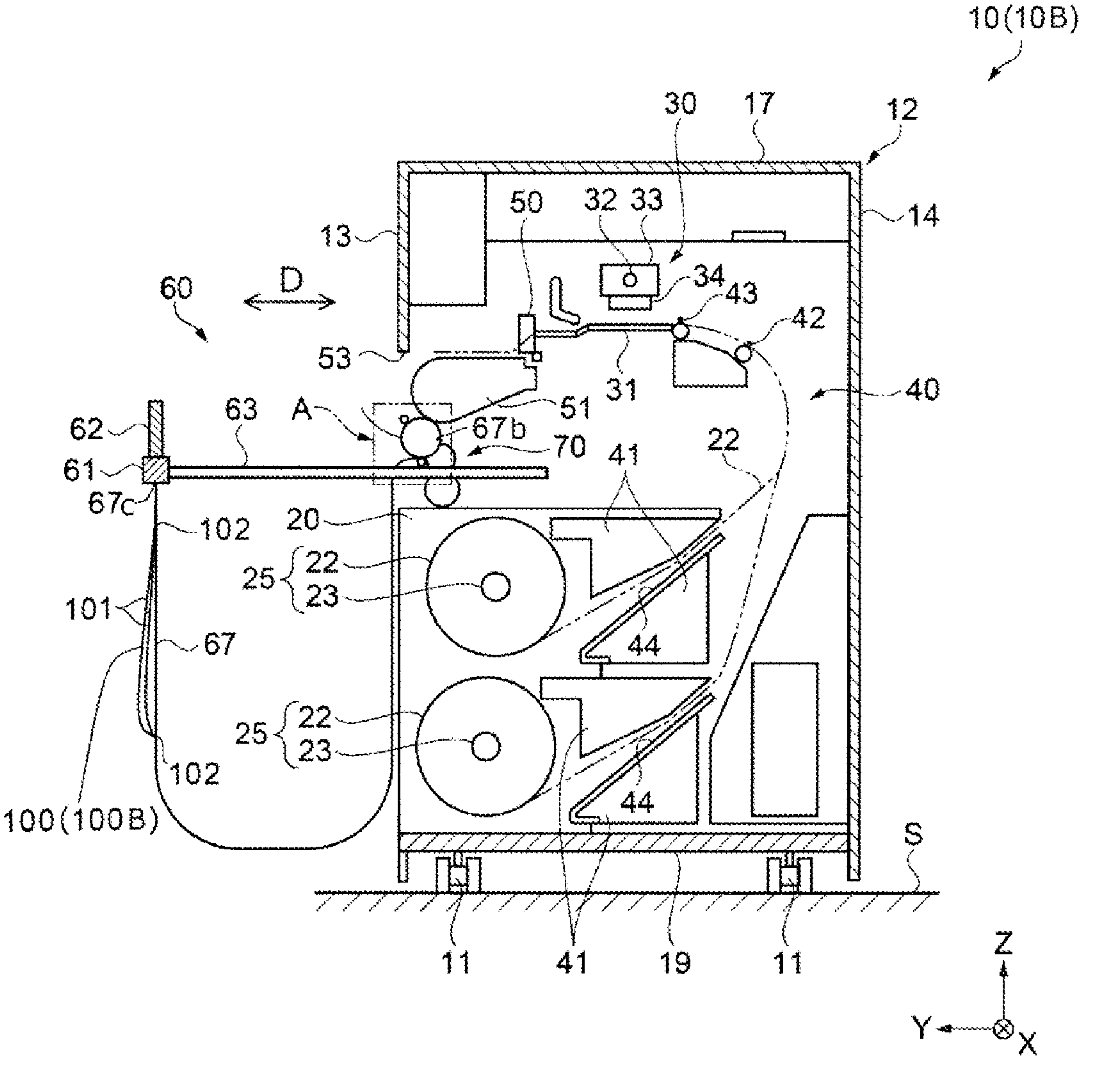
FIG. 11 is a cross-sectional view illustrating an internal configuration of the recording device according to Example 2.

Hereinafter, a recording device 10B of Example 2 will be described with reference to FIGS. 10 and 11. FIG. 10 is a diagram corresponding to FIG. 2 in the recording device 10A of Example 1, and FIG. 11 is a diagram corresponding to FIG. 3 in the recording device 10A of Example 1. The recording device 10B of the present embodiment is the same as the recording device 10A of Example 1 except for a configuration to be described below. Therefore, the recording device 10A of the present embodiment has the same characteristics as the recording device 10A of Example 1 except for the parts to be described below. Therefore, in FIGS. 10 and 11, the same constituent members as those of Example 1 are indicated by the same reference signs, and detailed description thereof will be omitted.

As described above, in the recording device 10A of Example 1, the weight 100 has been the rod-like weight 100A. On the other hand, as illustrated in FIGS. 10 and 11, in the recording device 10B of the present embodiment, the weight 100 is a sheet member 100B overlapped with and sewn to the accommodation member 67. Therefore, it is possible to make the entire weight 100 flexible. Further, it is possible to form the weight 100 without preparing new another constituent material by, for example, stacking and sewing the accommodation members 67 to form the sheet member.

Here, in the recording device 10B of the present embodiment, the seams 102 of the sheet member 100B overlapped with and sewn to the accommodation member 67 is formed on two upper and lower places in an axial direction of the pivot shaft 65, that is, in a width direction corresponding to the X direction. The flexibility becomes weaker and the accommodation member 67 is easily distorted since a place at which the sheet member 100B is overlapped and sewn is stiffer than other regions, but the seam 102 is formed in the axial direction of the pivot shaft 65, thereby making it possible to curb the distortion of the accommodation member 67 when viewed from a direction of gravity due to the weakened flexibility. The distortion of the accommodation member 67 when viewed from the direction of gravity is curbed, thereby making it possible to unwind the accommodation member 67 in a well-balanced manner in the width direction (the axial direction of the pivot shaft). Further, since the seam 102 is not provided at ends in the width direction, the user can access the inside of the bag portion 101 from the ends in the width direction. Therefore, the user can temporarily store various items such as stationery or tools in the bag portion 101.

In the present embodiment, the sheet member 100B is overlapped with and sewn to the accommodation member 67 in a state in which the same material as the accommodation member 67 is folded and doubled. However, the present disclosure is not limited to such a configuration, and a material different from that of the accommodation member 67 may be used, or a sheet member not folded or a sheet member folded three times or more may be used. Further, a portion of the accommodation member 67 itself which is seamlessly continuous between the one end 67*b* and the other end 67*c* is folded a plurality of times so that a crease is in the axial direction of the pivot shaft 65 so that a region made heavier than other regions is formed and the region made heavier than the other regions through folding may be used as the weight 100. For a folded region of the accommodation member 67, the seam 102 is sewn in the axial direction of the pivot shaft 65, resulting in the weight 100. In the present embodiment, since the weight 100 is formed by sewing together a flexible material, the weight 100 does not change its position on the accommodation member 67. It is desirable for a position at which the sheet member 100B which is the weight 100 is formed to be a place near the other end 67*c* of the accommodation member 67 and close to the operation portion 61. At an initial stage in which the operation portion 61 is separated from the pivot shaft 65 and the accommodation member 67 is unwound, it is possible to hang the accommodation member 67 down while effectively unwinding the accommodation member 67 from the pivot shaft 65 using the gravity G of the sheet member 100B.

Example 3

Figure 12:
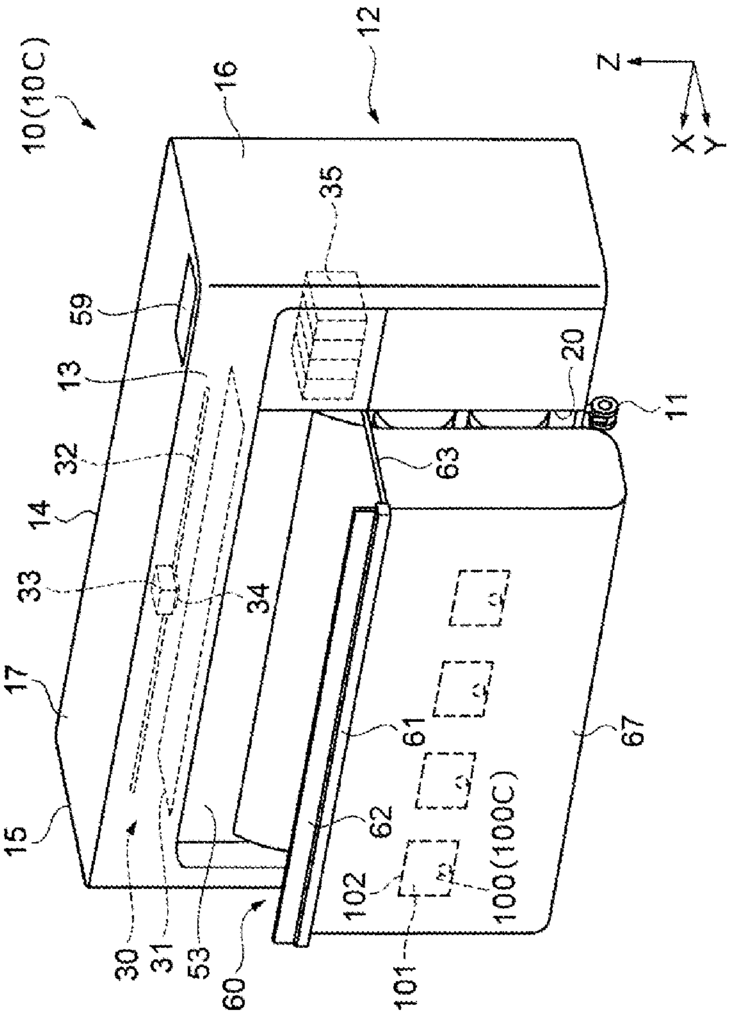
FIG. 12 is a perspective view illustrating a configuration of a recording device of Example 3 as the processing device according to the embodiment.
Figure 13:
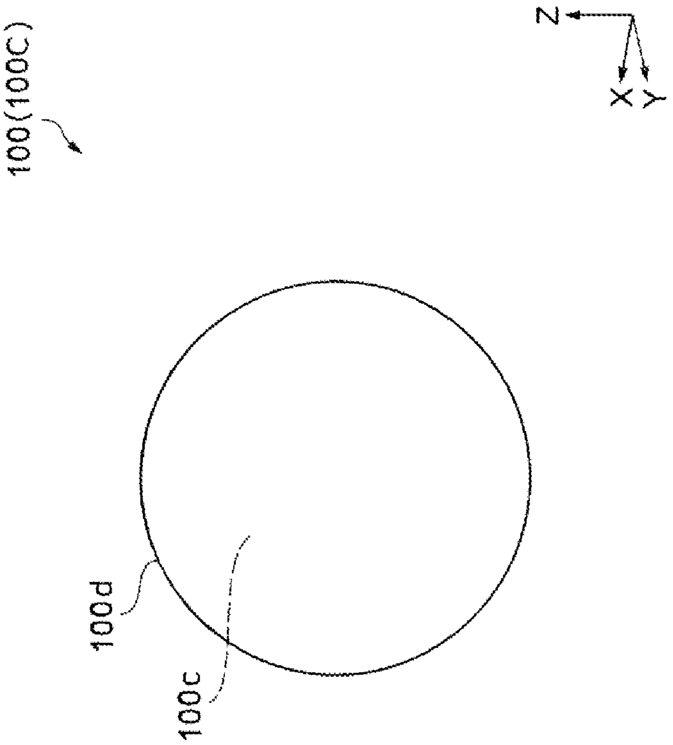
FIG. 13 is a schematic diagram illustrating a weight of a recording device of Example 3.

Hereinafter, a recording device 10C of Example 3 will be described with reference to FIGS. 12 and 13. FIG. 12 is a diagram corresponding to FIG. 2 in the recording device 10A of Example 1, and FIG. 13 is a diagram corresponding to FIG. 9 in the recording device 10A of Example 1. The recording device 10C of the present embodiment is the same as the recording device 10A of Example 1 except for a configuration to be described below. Therefore, the recording device 10A of the present embodiment has the same characteristics as the recording device 10A of Example 1 except for parts to be described below. Therefore, in FIGS. 12 and 13, the same constituent members as those of Examples 1 and 2 are denoted by the same reference signs, and detailed description thereof will be omitted.

As described above, in the recording device 10A of Example 1, the weight 100 has been the rod-like weight 100A. On the other hand, as illustrated in FIGS. 12 and 13, the weight 100 in the recording device 10C of the present embodiment is a spherical weight 100C. With such a configuration, for example, when the accommodation member 67 is unwound, it becomes possible to easily continue to position the weight 100 downward in a vertical direction in the bag portion 101, and to particularly preferably unwind the accommodation member 67.

Further, as illustrated in FIG. 12, the recording device 10C of the present embodiment includes a plurality of weights 100C, and the plurality of weights 100C are divided and stored in a plurality of bag portions 101. With such a configuration, for example, it is possible to unwind the accommodation member 67 in a well-balanced manner in a width direction (the axial direction of the pivot shaft 65) that intersects with the advance and retreat direction D when the accommodation member 67 is unwound.

The weight 100C of the present embodiment is configured of a metal sphere 100*c* inside, and a surface thereof is covered with a resin coating layer 100*d*. Therefore, it is possible to obtain the sturdy and small weight 100 with a large specific gravity, and to curb an increase in collision sound when the weight 100C collides with the installation surface S via the unwound accommodation member 67. However, the present disclosure is not limited to such a configuration, and for example, the entire spherical weight 100 may be formed only of metal or may be formed only of resin.

The present disclosure is not limited to the above-described examples, and can be realized in various configurations without departing from the spirit of the present disclosure. Further, technical characteristics in the embodiment corresponding to the technical characteristics in each form described in SUMMARY can be substituted or combined appropriately to solve some or all of the above-described problems, or to achieve some or all of the above-described effects. Further, when the technical characteristics are not described as essential ones in the present specification, the technical characteristics can be appropriately deleted.

What is claimed is:

1. A processing device comprising:

a processing unit accommodated in a housing and configured to process a medium; and a medium accommodation portion configured to accommodate the medium discharged from the housing, wherein the medium accommodation portion includes a flexible sheet-like accommodation member;

a pivot shaft provided inside the housing, one end of the accommodation member being coupled to the pivot shaft;

an operation portion to which the other end of the accommodation member is coupled and provided separably from the pivot shaft; and a pair of support portions advanceably and retreatably protruding from the housing in an advance and retreat direction in a separation direction from the pivot shaft of the operation portion, and configured to support both ends of the operation portion, and the accommodation member is wound around the pivot shaft and stored inside the housing when the operation portion approaches the pivot shaft, and is unwound from the pivot shaft and hung down to accommodate the medium when the operation portion is separated from the pivot shaft, and holds a weight on the other end side of an intermediate position between the one end and the other end in the advance and retreat direction.

2. The processing device according to claim 1, wherein the accommodation member has a bag portion, and the weight is stored in the bag portion.

3. The processing device according to claim 2, wherein the weight is movable inside the bag.

4. The processing device according to claim 2, comprising:

a plurality of the weights, wherein the plurality of weights are divided and stored in a plurality of the bag portions.

5. The processing device according to claim 1, wherein the weight contains a metal.

6. The processing device according to claim 1, wherein the weight has a rod-like shape.

7. The processing device according to claim 1, wherein the weight has a spherical shape.

8. The processing device according to claim 1, wherein at least part of a surface of the weight is a resin.

9. The processing device according to claim 1, wherein the weight is a sheet member overlapped with and sewn to the accommodation member.

10. The processing device according to claim 9, wherein a seam of the sheet member is formed in an axial direction of the pivot shaft.

11. The processing device according to claim 1, comprising:

a rack provided at at least one of support portions in the pair; and a pivot shaft gear provided at the pivot shaft and configured to pivot in conjunction with movement of the rack.

12. The processing device according to claim 11, comprising, between the rack and the pivot shaft gear, a speedup mechanism configured to speed up rotation of the pivot shaft gear and cause an amount of unwinding of the accommodation member to be larger than an amount of movement of the pair of support portions.

13. The processing device according to claim 1, wherein the pivot shaft is configured to further pivot half a turn or more from the position at which the amount of unwinding of the accommodation member is maximizable.

14. A recording device comprising:

a recording unit accommodated in a housing and configured to perform recording on a medium; and a medium accommodation portion configured to accommodate the medium discharged from the housing, wherein the medium accommodation portion includes a flexible sheet-like accommodation member;

a pivot shaft provided inside the housing, one end of the accommodation member being coupled to the pivot shaft;

an operation portion to which the other end of the accommodation member is coupled and provided separably from the pivot shaft; and a pair of support portions advanceably and retreatably protruding from the housing in an advance and retreat direction in a separation direction from the pivot shaft of the operation portion, and configured to support both ends of the operation portion, and the accommodation member is wound around the pivot shaft and stored inside the housing when the operation portion approaches the pivot shaft, and is unwound from the pivot shaft and hung down to accommodate the medium when the operation portion is separated from the pivot shaft, and holds a weight on the other end side of an intermediate position between the one end and the other end in the advance and retreat direction.

* * * * *